United States Patent
Wu et al.

(10) Patent No.: US 11,527,242 B2
(45) Date of Patent: Dec. 13, 2022

(54) LIP-LANGUAGE IDENTIFICATION METHOD AND APPARATUS, AND AUGMENTED REALITY (AR) DEVICE AND STORAGE MEDIUM WHICH IDENTIFIES AN OBJECT BASED ON AN AZIMUTH ANGLE ASSOCIATED WITH THE AR FIELD OF VIEW

(71) Applicant: BOE TECHNOLOGY GROUP CO., LTD., Beijing (CN)

(72) Inventors: Naifu Wu, Beijing (CN); Xitong Ma, Beijing (CN); Lixin Kou, Beijing (CN); Sha Feng, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 223 days.

(21) Appl. No.: 16/610,254

(22) PCT Filed: Apr. 24, 2019

(86) PCT No.: PCT/CN2019/084109
§ 371 (c)(1),
(2) Date: Nov. 1, 2019

(87) PCT Pub. No.: WO2019/206186
PCT Pub. Date: Oct. 31, 2019

(65) Prior Publication Data
US 2020/0058302 A1    Feb. 20, 2020

(30) Foreign Application Priority Data

Apr. 26, 2018    (CN) .......................... 201810384886.2

(51) Int. Cl.
*G10L 15/22* (2006.01)
*H04N 5/272* (2006.01)
(Continued)

(52) U.S. Cl.
CPC .............. *G10L 15/22* (2013.01); *G06V 20/20* (2022.01); *G06V 40/171* (2022.01); *G10L 15/1815* (2013.01); *G10L 15/25* (2013.01)

(58) Field of Classification Search
CPC .... H04N 5/272; G06F 40/58; G06K 9/00281; G06K 9/228; G02B 27/0172
(Continued)

(56) References Cited

U.S. PATENT DOCUMENTS 5,680,481 A * 10/1997 Prasad ............... G06K 9/00281
382/190
2003/0028380 A1    2/2003 Freeland et al.
(Continued)

FOREIGN PATENT DOCUMENTS

CN    101101752 A    1/2008
CN    101937268 A    1/2011
(Continued)

OTHER PUBLICATIONS

Chinese Office Action in Chinese Application No. 201810384886.2, dated Sep. 30, 2020 with English translation.
(Continued)

*Primary Examiner* — Farzad Kazeminezhad
(74) *Attorney, Agent, or Firm* — Collard & Roe, P.C.

(57) ABSTRACT

A lip-language identification method and an apparatus thereof, an augmented reality device and a storage medium. The lip-language identification method includes: acquiring a sequence of face images for an object to be identified; performing lip-language identification based on a sequence of face images so as to determine semantic information of speech content of the object to be identified corresponding to lip actions in a face image; and outputting the semantic information.

8 Claims, 7 Drawing Sheets

(51) Int. Cl.
  *G06F 40/58* (2020.01)
  *G02B 27/01* (2006.01)
  *G10L 15/18* (2013.01)
  *G10L 15/25* (2013.01)
  *G06V 20/20* (2022.01)
  *G06V 40/16* (2022.01)

(58) Field of Classification Search
  USPC ....... 348/239; 704/2; 382/190, 103; 345/633
  See application file for complete search history.

(56) References Cited

U.S. PATENT DOCUMENTS

| | | | |
|---|---|---|---|
| 2004/0243416 | A1 | 12/2004 | Gardos |
| 2010/0332229 | A1 | 12/2010 | Aoyama et al. |
| 2011/0071830 | A1 | 3/2011 | Kim et al. |
| 2012/0075184 | A1 | 3/2012 | Madhvanath |
| 2012/0242865 | A1* | 9/2012 | Vartanian .............. H04N 5/272 348/239 |
| 2014/0043498 | A1 | 2/2014 | Lee et al. |
| 2014/0129207 | A1* | 5/2014 | Bailey .................... G06F 40/58 704/2 |
| 2015/0302651 | A1* | 10/2015 | Shpigelman ....... G02B 27/0172 345/633 |
| 2016/0078318 | A1* | 3/2016 | Yoshigahara .......... G06K 9/228 382/103 |
| 2017/0098447 | A1 | 4/2017 | Fu |
| 2017/0264830 | A1 | 9/2017 | Udodov |
| 2018/0157333 | A1 | 6/2018 | Ross et al. |
| 2018/0205550 | A1 | 7/2018 | Appleyard et al. |
| 2020/0058302 | A1 | 2/2020 | Wu et al. |
| 2020/0106884 | A1 | 4/2020 | Miyamoto |

FOREIGN PATENT DOCUMENTS

| | | | |
|---|---|---|---|
| CN | 102004549 | A | 4/2011 |
| CN | 102298443 | A | 12/2011 |
| CN | 103853190 | A * | 11/2014 |
| CN | 104409075 | A | 3/2015 |
| CN | 106529502 | A | 3/2017 |
| CN | 107223277 | A | 9/2017 |
| CN | 107340859 | A | 11/2017 |
| CN | 108227903 | A | 6/2018 |
| CN | 108596107 | A | 9/2018 |

OTHER PUBLICATIONS

Written Opinion of the International Searching Authority of PCT/CN2019/084109 in Chinese, dated Jul. 31, 2019 with English translation.
International Search Report of PCT/CN2019/084109 in Chinese, dated Jul. 31, 2019, with English translation.
Chinese Office Action in Chinese Application No. 201810384886.2, dated Jan. 3, 2020 with English translation.
Office Action in U.S. Appl. No. 16/346,815 dated Sep. 29, 2021.
Final Office Action in U.S. Appl. No. 16/346,815 dated Feb. 7, 2022.
U.S. Notice of Allowance in U.S. Appl. No. 16/346,815 dated Jul. 7, 2022.

* cited by examiner

LIP-LANGUAGE IDENTIFICATION METHOD AND APPARATUS, AND AUGMENTED REALITY (AR) DEVICE AND STORAGE MEDIUM WHICH IDENTIFIES AN OBJECT BASED ON AN AZIMUTH ANGLE ASSOCIATED WITH THE AR FIELD OF VIEW

CROSS REFERENCE TO RELATED APPLICATIONS

This application is the National Stage of PCT/CN2019/084109 filed on Apr. 24, 2019, which claims priority under 35 U.S.C. § 119 of Chinese Application No. 201810384886.2 filed on Apr. 26, 2018, the disclosure of which is incorporated by reference.

TECHNICAL FIELD

At least one embodiment of the present disclosure relates to a lip-language identification method and an apparatus thereof, an augmented reality device and a storage medium.

BACKGROUND

An augmented reality (AR) technology is a new technology that integrates real objects and virtual information in a real environment. Its characteristic is that when virtual information is applied to a real environment, real objects and virtual information in the real environment may be integrated into a same picture or space, thereby achieving sensory experience beyond reality.

An existing virtual reality system mainly simulates a virtual three-dimensional world through a high-performance computing system with a central processing unit, and provides users with sensory experience such as visual experience and auditory sensory experience, so that users may feel like they are there, and at the same time may also carry out human-computer interactions.

SUMMARY

At least one embodiment of the present disclosure provides a lip-language identification method, which includes: acquiring a sequence of face images for an object to be identified; performing lip-language identification based on a sequence of face images, so as to determine semantic information of speech content of the object to be identified corresponding to lip actions in a face image; and outputting the semantic information.

For example, in the lip-language identification method provided by at least one embodiment of the present disclosure, performing lip-language identification based on the sequence of face images, so as to determine the semantic information of the speech content of the object to be identified corresponding to the lip actions in the face image, comprises: sending the sequence of face images to a server, and performing lip-language identification by the server so as to determine the semantic information of the speech content of the object to be identified corresponding to the lip actions in the face image.

For example, in the lip-language identification method provided by at least one embodiment of the present disclosure, before outputting the semantic information, the lip-language identification method further comprises: receiving semantic information sent by the server.

For example, in the lip-language identification method provided by at least one embodiment of the present disclosure, the semantic information is semantic text information and/or semantic audio information.

For example, in the lip-language identification method provided by at least one embodiment of the present disclosure, outputting the semantic information comprises: outputting the semantic text information within a visual field of a user wearing an augmented reality device or playing the semantic audio information, according to an output mode instruction.

For example, in the lip-language identification method provided by at least one embodiment of the present disclosure, acquiring the sequence of face images for the object to be identified, comprises: acquiring a sequence of images including the object to be identified; positioning an azimuth of the object to be identified; and determining a position of a face region of the object to be identified in each frame image in the sequence of images according to the positioned azimuth of the object to be identified; and generating the sequence of face images by cropping images of the face region of the object to be identified from each frame of the images.

For example, in the lip-language identification method provided by at least one embodiment of the present disclosure, positioning the azimuth of the object to be identified, comprises: positioning the azimuth of the object to be identified according to a voice signal emitted when the object to be identified is speaking.

For example, in the lip-language identification method provided by at least one embodiment of the present disclosure, after acquiring the sequence of face images for the object to be identified, further comprises: saving the sequence of face images.

For example, in the lip-language identification method provided by at least one embodiment of the present disclosure, sending the sequence of face images to the server, comprises: sending the saved sequence of face images to the server when a sending instruction is received.

At least one embodiment of the present disclosure further provides a lip-language identification apparatus, which includes a face image sequence acquiring unit, a sending unit and a receiving unit. The face image sequence acquiring unit is configured to acquire a sequence of face images for an object to be identified; the sending unit is configured to send a sequence of face images to a server, and the server performs lip-language identification so as to determine semantic information corresponding to lip actions in a face image; and the receiving unit is configured to receive semantic information sent by the server.

For example, the lip-language identification apparatus provided by at least one embodiment of the present disclosure further comprises an output unit. The output unit is configured to output semantic information.

For example, in the lip-language identification apparatus provided by at least one embodiment of the present disclosure, the output unit comprises an output mode instruction generation subunit which is configured to generate an output mode instruction. The output mode instruction includes a display mode instruction and an audio mode instruction.

For example, in the lip-language identification apparatus provided by at least one embodiment of the present disclosure, the semantic information is semantic text information and/or semantic audio information, and the output unit further comprises a display subunit and a play subunit. The display subunit is configured to display the semantic text information within a visual field of a user wearing an augmented reality device when the display mode instruction is received, and the play subunit is configured to play the semantic audio information when the audio mode instruction is received.

For example, in the lip-language identification apparatus provided by at least one embodiment of the present disclosure, the face image sequence acquiring unit comprises an image sequence acquiring subunit, a positioning subunit and a face image sequence generation subunit. The image sequence acquiring subunit is configured to acquire a sequence of images for the object to be identified. The positioning subunit is configured to position an azimuth of the object to be identified. The face image sequence generation subunit is configured to determine a position of a face region of the object to be identified in each frame image in the sequence of images according to the positioned azimuth of the object to be identified, and crop an image of the face region of the object to be identified from the each frame image so as to generate the sequence of face images.

At least one embodiment of the present disclosure further provides a lip-language identification apparatus, which includes a processor and a machine-readable storage medium storing one or more computer program modules. The one or more computer program modules are stored in the machine-readable storage medium and configured to be executed by the processor, and the one or more computer program modules include instructions for performing the lip-language identification method according to any embodiment of the present disclosure.

At least one embodiment of the present disclosure further provides an augmented reality device, which includes the lip-language identification apparatus according to any embodiment of the present disclosure.

For example, the augmented reality device provided by at least one embodiment of the present disclosure further comprises a camera device, a display device or a play device. The camera device is configured to capture an image of the object to be identified; the display device is configured to display semantic information; and the play device is configured to play the semantic information.

At least one embodiment of the present disclosure further provides a lip-language identification method, which includes: receiving a sequence of face images for an object to be identified sent by an augmented reality device; performing lip-language identification based on a sequence of face images so as to determine semantic information of speech content of the object to be identified corresponding to lip actions in a face image; and sending semantic information to the augmented reality device.

At least one embodiment of the present disclosure further provides a storage medium, which stores non-transitorily computer readable instructions that, when executed by a computer, the computer may perform the lip-language identification method according to any embodiment of the present disclosure.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
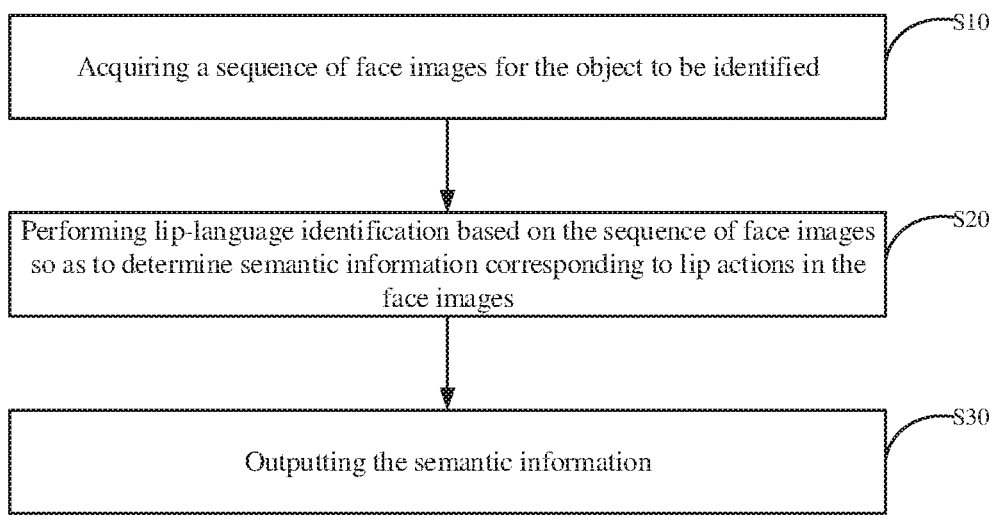
FIG. 1 is a flowchart of a lip-language identification method provided by at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by those of ordinary skill in the art to which the present disclosure belongs. The terms "first," "second," etc., which are used in the description and the claims of the present disclosure, are not intended to indicate any sequence, amount or importance, but used to distinguish various components. Similarly, the terms, such as "a," "an," "the," or the like are not intended to denote limitation of quantity, but rather denote presence of at least one. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

Exemplary embodiments will be described in detail herein, examples of which are represented in the accompanying drawings. When the following description refers to the drawings, unless otherwise indicated, like reference numerals in different drawings may refer to like or similar elements. The implementations described in the following exemplary embodiments do not represent all implementations consistent with this disclosure. On the contrary, they are merely examples of apparatuses and methods consistent with some aspects of the present disclosure, as described in detail in the appended claims.

For example, an AR device may be provided with a camera device, the camera device may collect real objects in a real environment in real time, and further realize the integration with virtual information by calculating the position and angle of the real objects and corresponding image processing. The functions of conventional augmented reality devices still have large expandable space.

At least one embodiment of the present disclosure provides a lip-language identification method, which includes: acquiring a sequence of face images for an object to be identified; performing lip-language identification based on a sequence of face images, so as to determine semantic information of speech content of the object to be identified corresponding to lip actions in a face image; and outputting the semantic information.

At least one embodiment of the present disclosure further provides a lip-language identification apparatus, an augmented reality device and a storage medium corresponding to the lip-language identification method described above.

The lip-language identification method provided by at least one embodiment of the present disclosure, on one hand, may determine speech content of an object to be identified, output lip-language language of the object to be identified, and implement the translation of the lip-language of the object to be identified; and on the other hand, in the lip-language identification method provided by at least one embodiment of the present disclosure, the lip-language identification method may be implemented by using components of the existing AR devices, without separately adding hardware, so that the functions of the AR devices may be expanded without increasing cost, and the user experience may be further improved.

Embodiments of the present disclosure will be described in detail below with reference to the accompanying drawings.

At least one embodiment of the present disclosure provides a lip-language identification method, which may further expand the functions of augmented reality devices and improve the user experience of the devices. For example, the lip-language identification method may be used for AR devices or VR (Virtual Reality) devices, etc. The embodiments of the present disclosure are not limited to this. For example, the lip-language identification method may be implemented at least partially in software and loaded and executed by a processor in the AR devices, or at least partially in hardware or firmware, etc., so as to expand the functions of augmented reality devices and improve the user experience of the devices.

FIG. 1 is a flowchart of a lip-language identification method provided by at least one embodiment of the present disclosure. As illustrated in FIG. 1, the lip-language identification method includes steps S10 to S30. Steps S10 to S30 of the lip-language identification method and their respective exemplary implementations are described below.

Step S10: acquiring a sequence of face images for an object to be identified.

Step S20: performing lip-language identification based on a sequence of face images so as to determine semantic information corresponding to lip actions in a face image.

Step S30: outputting the semantic information.

For example, an AR device is a head-mounted wearable intelligent device, which may achieve sensory experience beyond reality by using the augmented reality technology.

For example, an AR device combines image display, image processing, multi-sensor fusion, three-dimensional modeling and other technologies, and may be applied to medical treatment, games, network video communication, exhibitions and other fields.

A current AR device usually includes a camera device (e.g., a camera), an optical projection device (a device composed of optical elements such as various lenses, which may project images into the visual field of a user wearing an AR device), a sound acquisition device (e.g., a speaker or a microphone, etc.), and the like, and has expandable space in functions.

The camera device may include, for example, a CMOS (complementary metal oxide semiconductor) sensor, a CCD (charge coupled device) sensor, an infrared camera, and the like. For example, the camera device may be arranged in a plane where an OLED display screen is located, for example, on a frame of the AR device.

For example, an image may be acquired using a camera device in an AR device. After a user wears the AR device, the camera device may acquire images within the field of view. If the user needs to communicate with other objects, for example, when meeting or talking with other objects, the user usually faces the objects that need to communicate. At this time, the camera device may acquire images of the communicating objects within the field of view, including the images of the communicating objects.

For step S10, for example, the above-mentioned object to be identified refers to an object in an image acquired by a camera device of an AR device. For example, the object may be a person who communicates with it or a person who is in a video, and the embodiments of the present disclosure are not limited to this. For example, multi-frame images continuously acquired by the camera device may be formed into a sequence of images. Because the images acquired by the camera device contain the object to be identified and also include the region where the face of the object to be identified is located, multi-frame images including the region where the face of the object to be identified is located are served as a sequence of face images for the object to be identified.

For example, specific implementation examples of acquiring a sequence of face images are described in detail below and will not be repeated here.

For example, a face image sequence acquiring unit may be provided, and a sequence of face images for an object to be identified may be acquired by the face image sequence acquiring unit. For example, the face image sequence acquiring unit is implemented by a central processing unit (CPU), an image processing unit (GPU), a tensor processing unit (TPU), a field programmable gate array (FPGA) or other forms of processing units having data processing capability and/or instruction execution capability and corresponding computer instructions. For example, the processing unit may be a general-purpose processor or a special-purpose processor, and may be a processor based on X86 or ARM architecture, etc.

For step S20, for example, in one example, a face sequence may be processed by a central processing unit (CPU), an image processing unit (GPU), a field programmable gate array (FPGA), or other forms of processing units having data processing capability and/or instruction execution capability in an AR device so as to perform lip-language identification. For example, in another example, a sequence of face images may also be sent to a server. For example, the server may be a local server, a server provided in a local area network, or a cloud server, so that the face sequence may be processed by the server (e.g., a processing unit in the server, etc.) for performing lip-language identification, so as to determine semantic information of speech content of the object to be identified corresponding to lip actions in a face image. For example, the sequence of face images may be transmitted to the server through wireless communication manners such as Bluetooth and Wi-Fi, etc.

For example, the server may perform lip-language identification according to the received sequence of face images. Each frame of face image in the sequence of face images includes a region where a face of an object to be identified is located, and the region where the face is located includes lips of a person. The server may identify a face from each frame of face image using a face identification algorithm; lip-shape change characteristics of an object to be identified (i.e. a person) when speaking may further be extracted according to the identified face, because of a plurality of consecutive multi-frame images in the sequence of face images; the lip-shape change characteristics may be input into a lip-language identification model so as to identify corresponding pronunciations; sentences or phrases capable of expressing semantics and the like formed by each pronunciation may further be determined according to the identified pronunciations, and the sentences or phrases may be sent to an augmented reality device as semantic information, the augmented reality device may output the semantic information after the semantic information is received, and then a user wearing the AR device may know content or meaning of speech of the object to be identified according to the output semantic information.

It should be noted that the face identification algorithm may be implemented using conventional algorithms in the art, and will not be repeated here.

For example, the above-mentioned lip-language identification model may be a network model based on deep learning, such as a convolutional neural network (CNN) model or a multi-layer feedback neural network (RNN) model, etc. Corresponding pronunciations are identified according to the lip-shape change characteristics of an object to be identified when speaking using the network model, and each pronunciation is matched by using a preset database for a plurality of corresponding relationships between pronunciations with sentences or phrases, so as to determine sentences or phrases capable of expressing semantics and composed of each pronunciation.

For example, the above semantic information does not necessarily identify all pronunciations represented by the lip-shape changes of the object to be identified when speaking, and important semantic information or key semantic information of the speech content of the object to be identified may be identified. For example, the sentence or phrase formed by pronunciations may serve as the determined sentence or phrase with the greatest possibility.

For example, a sending unit may be provided, and a sequence of face images may be sent to a server through the sending unit, so that the server perform lip-language identification. For example, the sending unit may be implemented by a central processing unit (CPU), an image processing unit (GPU), a tensor processing unit (TPU), a field programmable gate array (FPGA) or other forms of processing units having data processing capability and/or instruction execution capability, and corresponding computer instructions.

For example, an identification unit may also be provided directly in an AR device, and the identification unit performs lip-language identification. For example, the identification unit may be implemented by a central processing unit (CPU), an image processing unit (GPU), a tensor processing unit (TPU), a field programmable gate array (FPGA) or other forms of processing units having data processing capability and/or instruction execution capability, and corresponding computer instructions.

For step S30, for example, after speech content of an object to be identified is determined based on the lip-language identification method, lip-language of the object to be identified may be output, thereby implementing the translation of the lip-language of the object to be identified.

In the lip-language identification method provided by at least one embodiment of the present disclosure, components of the existing AR devices may be utilized without separately adding hardware, so that the functions of the AR devices may be expanded without increasing cost, and the user experience may be further improved.

It should be note that algorithm and model for lip-language identification need to be supported by chips or hardware having complex data processing capability and operation speed. Therefore, that above-mentioned algorithm and model for the lip-language identification may not be provided on AR devices, for example, may be processed through a server. In this way, the portability of the AR devices is not affected, and also the hardware cost of the AR devices is not increased. Of course, with the improvement of scientific and technological level, in the case where the portability and the hardware cost of the AR devices are not affected, the processing units in AR devices may also implement the above-mentioned lip-language identification algorithm and model, thereby improving the market competitiveness of the AR devices. The embodiments of the present disclosure do not limit this. In the following, the lip-language identification method implemented by a server is taken as an example for illustrating, but the embodiments of the present disclosure are not limited to this.

For example, the semantic information may be semantic text information in text form or semantic audio information in audio form, or may include both semantic text information and semantic audio information. For example, the lip-language identification method further includes outputting semantic information. For example, a server may send voice and/or text information to an AR device, and an output mode button, menu or the like may be provided on the AR device. For example, the output mode may include a display mode and an audio mode. A user may select the output mode as required, and a corresponding output mode instruction will be generated after the user selects the output mode. For example, when the output mode instruction is a display mode instruction, the AR device may display the semantic text information within a visual field of the user wearing the augmented reality device according to the instruction; when the output mode instruction is an audio mode instruction, the augmented reality device plays the semantic audio information.

For example, an output may be provided and semantic information may be shown through the output unit. For example, the output unit may be implemented by a central processing unit (CPU), an image processing unit (GPU), a tensor processing unit (TPU), a field programmable gate array (FPGA) or other forms of processing units having data processing capability and/or instruction execution capability, and corresponding computer instructions.

The lip-language identification method provided by at least one embodiment of the present disclosure may convert the identified lip-language of the object to be identified into text or audio, and implement the translation of the lip-language, which helps people with special needs to better communicate with others. For example, people with hearing impairment or the elderly, etc., cannot hear voice of others when speaking or are inconvenient to communicate with others, which brings inconvenience to their lives. However, by wearing the AR device, the speech content of others may be converted into text for helping communicate with others.

Alternatively, for special situations, for example, at occasions requiring silence (such as meeting rooms requiring confidentiality or the like), participants may speak in a low voice, and others may not be able to clearly hear the speaker's speech. Alternatively, in a large reporting hall, participants who are far away from the speaker cannot clearly hear the speech content of the speaker. Alternatively, in places with high noise, communication personnel cannot clearly hear the speech content of the speaker. For example, in these cases, the personnel may wear the AR device to convert the lip-language of the speaker to be identified into text or audio as needed, thereby implementing the translation of the lip-language and effectively improving the fluency of communication.

Figure 2A:
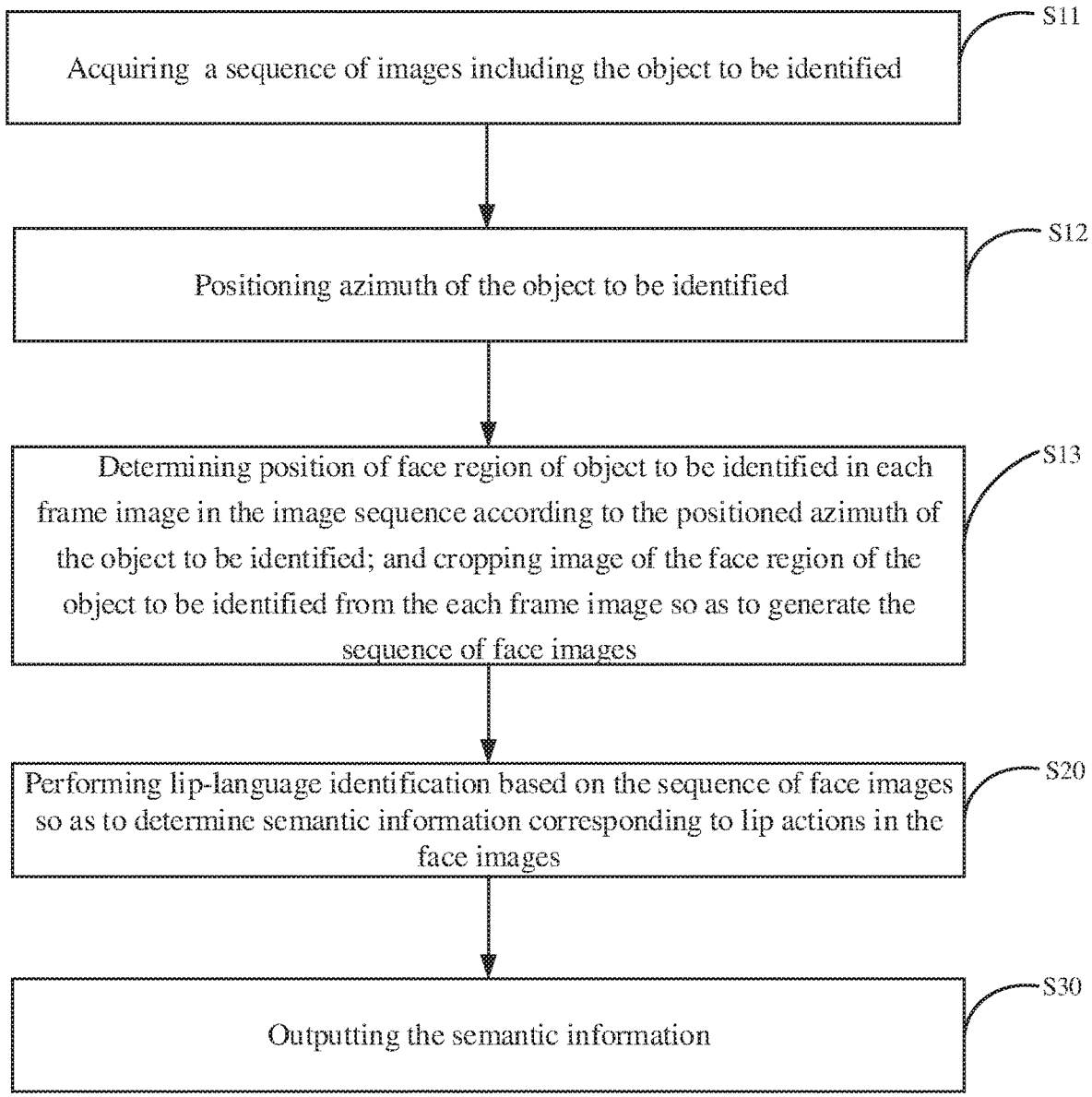
FIG. 2A is a flowchart of another lip-language identification method provided by at least one embodiment of the present disclosure.

FIG. 2A is a flowchart of acquiring a sequence of face images according to at least one embodiment of the present disclosure, that is, FIG. 2A is a flowchart of some examples of step S10 illustrated in FIG. 1. In some embodiments, as illustrated in FIG. 2A, the step S10 of acquiring a sequence of face images for an object to be identified includes steps S11 to S13.

Step S11: acquiring a sequence of images including an object to be identified.

Step S12: positioning an azimuth of the object to be identified.

Step S13: determining a position of a face region of the object to be identified in each frame image in the sequence of images according to the positioned azimuth of the object to be identified; and generating the sequence of face images by cropping images of the face region of the object to be identified from each frame of the images.

For example, the embodiments of the present disclosure do not limit the order of steps S11 and S12. For example, step S12 may be performed before step S11, that is, the azimuth of the object to be identified is determined first, and then the sequence of images for the object to be identified on the azimuth is acquired, for example, the sequence of face images may be directly acquired. For example, step S11 may be performed first and then step S12 may be performed, that is, the sequence of images including the object to be identified is acquired first, and then the sequence of face images for the object to be identified is accurately and quickly acquired according to the determined azimuth of the object to be identified.

For example, a video of an object to be identified may be collected by a camera device of an AR device, and the video consists of continuous multi-frame images, or the camera device captures multiple frames of images for the object to be identified continuously, and these multiple frames of images may form a sequence of images. Each frame of images includes the object to be identified, and also includes the face region of the object to be identified. The sequence of images may be directly used as a sequence of face images. For example, the images in the sequence may be original images directly acquired by the camera device or images obtained after preprocessing the original images, and the embodiments of the present disclosure are not limited to this.

For example, an image preprocessing operation may eliminate irrelevant information or noise information in the original image so as to better carry out face detection on the collected images. For example, the image preprocessing operation may include image scaling, compression or format conversion, color gamut conversion, Gamma correction, image enhancement or noise reduction filtering and others on the collected images.

For example, for lip-language identification, only a region containing a face of an object to be identified is required. In order to further improve identification speed, a partial image of the face region of the object to be identified may be cropped from each frame of images so as to generate a sequence of face images. For example, the sequence of face images includes multi-frame face images, each frame face image is a partial image taken from the entire image of an object to be identified, and the partial image includes a face region.

For example, when cropping a face image from an image, it is necessary to position an azimuth of an object to be identified, that is, the azimuth of a face region of the object to be identified in the space where a user wearing an AR device is located. For example, the user wearing the AR device is in a conference room, and the object to be identified is at a certain position in the conference room. With respect to the field of view range of the camera device of the AR device, the position of the object to be identified may take a central axis of the field of view range of the camera device of the AR device as a reference position. An angle between the position of the object to be identified and the central axis may be served as the azimuth of the object to be identified, and then the position of the face region of the object to be identified in the image may be further positioned according to the azimuth of the object to be identified.

For example, when a user wearing an AR device faces an object to be identified, an angle between the object to be identified and the center axis of the field of view of a camera device of the AR device is 30 degrees to the right, and this 30 degrees is the azimuth of the object to be identified. According to this orientation, the position of the object to be identified in the image may be preliminarily determined to be within a certain region at a certain distance from the center of the image, then the face identification may be performed on this region, the face region may be further positioned, and this partial image is cropped as a face image.

For example, a large number of (e.g., 10000 or more) images including human faces may be collected in advance as a sample library, and feature extraction may be performed on the images in the sample library. Then, a classification model is trained and tested by machine learning (e.g. depth learning, or regression algorithm based on local features) and other algorithms using the images in the sample library and the extracted feature points so as to obtain a classification model for obtaining the user's face images. For example, the classification model may also be implemented by other conventional algorithms in the art, such as Support Vector Machine (SVM), etc., and the embodiments of the present disclosure are not limited to this. It should be noted that the machine learning algorithm may be implemented by conventional methods in the art, and will not be repeated here. For example, the input of the classification model is the collected images and the output is face images of users, so that the face identification may be implemented.

For example, there may be various ways to position the azimuth of the object to be identified, and the embodiments of the present disclosure are not limited to the above-mentioned positioning ways. For example, an AR device may be provided with an infrared sensor, which may sense an object to be identified and further position the azimuth of the object to be identified. In a case where there are a plurality of objects to be identified, the orientations of the plurality of objects to be identified may be sensed through the infrared sensor. However, if only one of the objects to be identified is speaking, for lip-language identification, only the face image of the object to be identified who is speaking needs to be identified, and that of other objects to be identified who are not speaking are not needed.

Because the object to be identified that is speaking cannot be positioned by the infrared sensor, therefore, the azimuth of the object to be identified may be positioned by means of sound localization, i.e. according to a voice signal emitted when the object to be identified is speaking. Specifically, a microphone array may be arranged on an AR device, and the microphone array is a cluster of microphones and is a set consisting of a plurality of microphones, and the location of a sound source may be positioned through the microphone array. For example, a voice signal of the object (person) to be identified is also a sound source, so that the azimuth of the object to be identified that is speaking may be identified accordingly. If a plurality of objects to be identified are speaking at the same time, the orientations of the plurality of objects to be identified that are speaking may also be positioned, and the above positioning does not require that an accurate position of the object to be identified is positioned accurately, as long as an approximate azimuth is positioned.

Of course, this lip-language identification method is feasible even if the object to be identified that is speaking is not positioned. In the subsequent lip-language identification, the lip-shape of the object to be identified that is not speaking is basically the same. Therefore, for this object to be identified, semantic information will not be determined, thus only the semantic information of the object to be identified that is speaking will be determined.

For example, a user may choose to identify lip-language in real time, and a camera device of an AR device may collect images of an object to be identified in real time. For example, the AR device acquires a sequence of face images and sends the sequence of face images to a server in real time, and the server returns semantic information after performing lip-language identification based on the sequence of face images, and the AR device outputs the semantic information after the semantic information is received.

For example, the user may also choose not to identify lip-language in real time according to needs, and the camera device of the AR device still collects images for the object to be identified in real time. For example, after acquiring a sequence of face images, the sequence of face images may be generated after analysis according to a video directly collected by the camera device (the video is composed of continuous multi-frame images), or generated by multi-frame face images captured by the camera device using a capture method. For example, after acquiring the sequence of face images, the sequence of face images is saved. For example, the sequence of face images may be saved in an AR device (e.g., saved in a register of the AR device). For example, the AR device may be provided with a send button or menu, etc. The user may select the timing for lip-language identification for the saved sequence of face images as required. At this time, the user operates the send button or menu to generate a sending instruction, and the AR device sends the saved sequence of face images to a server according to the sending instruction, the server returns semantic information after performing lip-language identification according to the sequence of face images, and the AR device receives the semantic information and outputs it.

For example, the above-mentioned method of not performing identify lip-language in real time may be applied to scenes in which an AR device is worn and two-way communication with an object to be identified is not required in real time. For example, when taking part in some speeches or reports, users in the meeting hall having no hearing impairment may normally hear the speech of the speaker or the speaker of the report. In order to sort out or review the speech content later, the AR device may be worn. The AR device may first save the acquired sequence of face images and then send it to a server for lip-language identification when needed.

At least one embodiment of the present disclosure also provides a lip-language identification method, for example, the lip-language identification method is implemented by a server. For example, the lip-language identification method may be implemented at least partially in software and loaded and executed by a processor in a server, or at least partially in hardware or firmware, etc., so as to expand the functions of augmented reality devices and enhance the user experience of the devices.

Figure 2B:
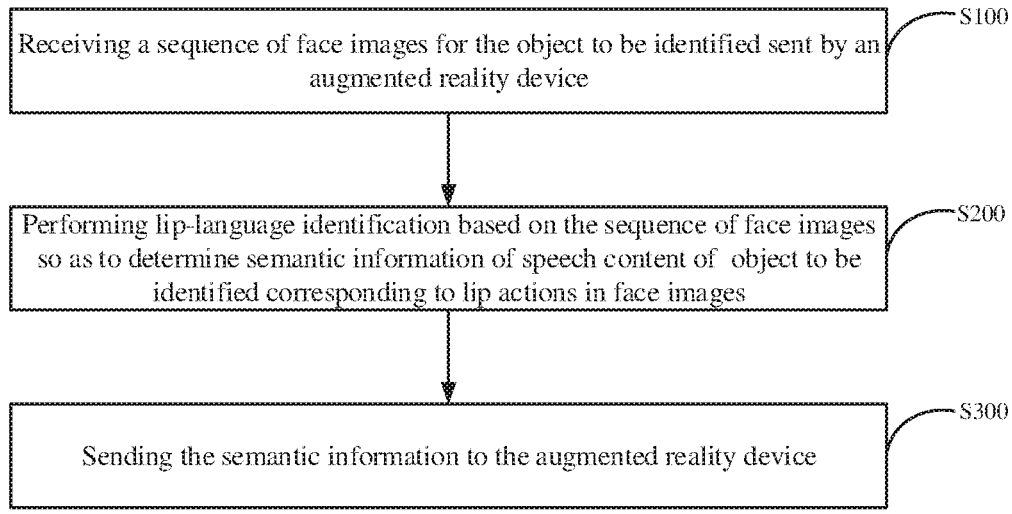
FIG. 2B is a flowchart of yet another lip-language identification method provided by at least one embodiment of the present disclosure.

FIG. 2B is a flowchart of another lip-language identification method provided by at least one embodiment of the present disclosure. As illustrated in FIG. 2B, the lip-language identification method includes steps S100 to S300. Steps S100 to S300 of the lip-language identification method and their respective exemplary implementations are described below.

Step S100: receiving a sequence of face images for an object to be identified sent by an augmented reality device.

For example, a server receives, for example, a sequence of face images for an object to be identified sent by an AR device. The specific method for obtaining the sequence of face images may refer to the relevant description of step S10 and will not be repeated here.

Step S200: performing lip-language identification based on a sequence of face images so as to determine semantic information of speech content of the object to be identified corresponding to lip actions in a face image.

For example, lip-language identification may be performed by a processing unit in a server based on the sequence of face images. For example, the specific implementation method of lip-language identification may refer to the relevant description of step S20 and will not be repeated here.

Step S300: sending semantic information to the augmented reality device.

For example, the semantic information is semantic text information and/or semantic audio information. The semantic information is transmitted by a server to, for example, an AR device so that the semantic information may be displayed or played on the AR device.

The technical effects of the lip-language identification method in the embodiments of the present disclosure may refer to the technical effects of the lip-language identification method provided in the above embodiments of the present disclosure and will not be repeated here.

Figure 2C:
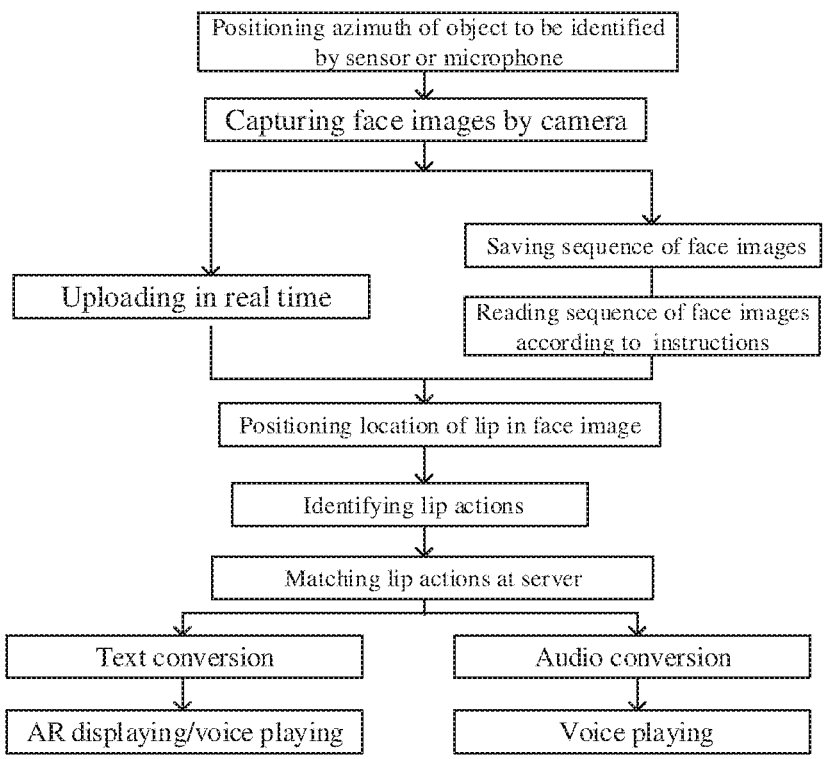
FIG. 2C is a system flow chart of a lip-language identification method provided by at least one embodiment of the present disclosure.

FIG. 2C is a system flowchart of a lip-language identification method according to at least one embodiment of the present disclosure. The lip-language identification method provided by at least one embodiment of the present disclosure will be systematically described below with reference to FIG. 2C.

First, an azimuth of an object to be identified (e.g., a speaker) may be positioned according to an infrared sensor or a microphone, and face images may be collected through a camera. For example, the collected face images may be uploaded in real time for lip-language identification, or may be uploaded in non-real time. For example, in the case where uploaded in non-real time, a sequence of face images may be saved to a register in an AR device, and the sequence of face images may be read according to a sending instruction and be sent to a server.

For example, after face image information is transmitted to a server, based on a face image in the orientation, a location of the lip may be positioned in the face image, so that semantic information may be obtained by identifying lip actions. For example, the lip actions may be matched at the server terminal, so that semantic information corresponding to the lip actions is converted into text or audio so as to obtain semantic text information or semantic audio information respectively. For example, semantic text information may be displayed or played by voice on an AR device. The semantic audio information may be played by voice.

Figure 3A:
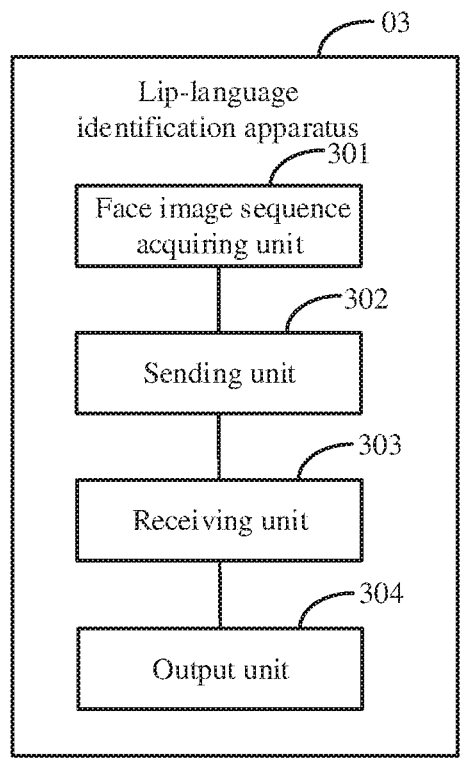
FIG. 3A is a schematic block diagram of a lip-language identification apparatus provided by at least one embodiment of the present disclosure.
Figure 3B:
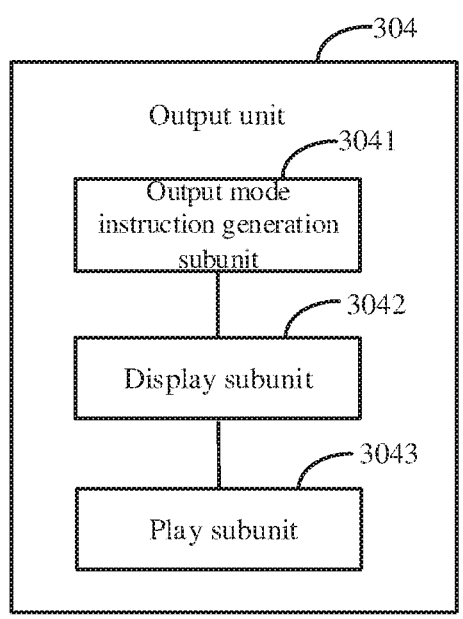
FIG. 3B is a schematic block diagram of the output unit 304 illustrated in FIG. 3A.

At least one embodiment of the present disclosure also provides a lip-language identification apparatus. FIG. 3A is a schematic block diagram of a lip-language identification apparatus according to at least one embodiment of the present disclosure. As illustrated in FIG. 3A, in some examples, the lip-language identification apparatus 03 includes a face image sequence acquiring unit 301, a sending unit 302, and a receiving unit 303. In other examples, the lip-language identification apparatus 03 further includes an output unit 304.

The face image sequence acquiring unit 301 is configured to acquire a sequence of face images for an object to be identified. For example, the face image sequence acquiring unit 301 may implement step S10, and the specific implementation method thereof may refer to the relevant description of step S10 and will not be repeated here.

The sending unit 302 is configured to send a sequence of face images to a server, and the server performs lip-language identification so as to determine semantic information corresponding to lip actions in a face image. For example, the sequence of face images may be transmitted to the server through wireless communication manners such as Bluetooth and Wi-Fi, etc. For example, the sending unit 302 may implement step S20, and the specific implementation method thereof may refer to the relevant description of step S20, and will not be repeated here.

The receiving unit 303 is configured to receive semantic information sent by the server. The output unit 304 is configured to output semantic information. For example, the receiving unit 303 and the output unit 304 may implement step S30, and the specific implementation method thereof may refer to the relevant description of step S30 and will not be repeated here.

For example, in some embodiments, semantic information is semantic text information and/or semantic audio information. For example, in some examples, the output unit 304 may include an output mode instruction generation subunit 3041. In other examples, the output unit 304 may further include a display subunit 3042 and a play subunit 3043.

The output mode instruction generation subunit 3041 is configured to generate an output mode instruction. For example, the display mode instruction includes a display mode instruction and an audio mode instruction.

The display subunit 3042 is configured to display the semantic text information within a visual field of a user wearing an augmented reality device when the display mode instruction is received.

The playback subunit 3043 is configured to play the semantic audio information when the audio mode instruction is received.

Figure 3C:
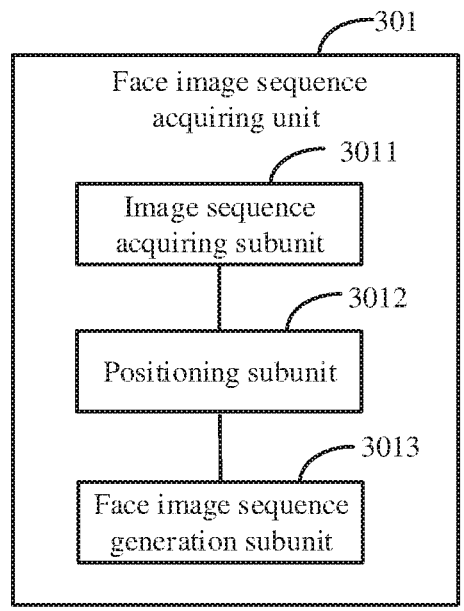
FIG. 3C is a schematic block diagram of the face image sequence acquiring unit 301 illustrated in FIG. 3A.

For example, in some examples, as illustrated in FIG. 3C, the face image sequence acquiring unit 301 includes an image sequence acquiring subunit 3011, a positioning subunit 3012, and a face image sequence generation subunit 3013.

The image sequence acquiring subunit 3011 is configured to acquire a sequence of images of an object to be identified.

The positioning subunit 3012 is configured to position an azimuth of the object to be identified.

The face image sequence generation subunit 3013 is configured to determine a position of a face region of the object to be identified in each frame image in the sequence of images according to the positioned azimuth of the object to be identified; and crop an image of the face region of the object to be identified from the each frame image so as to generate the sequence of face images.

Corresponding to the embodiments of the above-mentioned AR device-based lip-language identification method, the AR device-based identification apparatus provided by the embodiments of the present disclosure may determine the speech content of the object to be identified, output the lip-language of the object to be identified, and implement the translation of the lip-language of the object to be identified. In addition, components of the existing AR devices may be utilized without separately adding hardware, so that the functions of the AR devices may be expanded without increasing cost, and the user experience may be further improved.

The embodiments of the apparatus described above are only schematic, and the units described as separate components may or may not be physically separated, i.e. may be located in one place or may be arranged over a plurality of network units. The above-mentioned units may be combined into one unit or further split into a plurality of subunits.

For example, each unit in the apparatus of the embodiments may be implemented by means of software, or by means of software and hardware, and of course, may also be implemented by means of general-purpose hardware. Based on this understanding, the technical solutions provided by the embodiments of the present disclosure, in essence or for part of the technical solutions that contributes to the prior art, may be embodied in the form of software products. Taking software implementation as an example, as a logical apparatus, which is formed by reading corresponding computer program instructions in a nonvolatile memory into a memory through a processor included in an AR device applying the apparatus and operating the computer program instructions.

It should be noted that the lip-language identification apparatus provided by the embodiments of the present disclosure may include more or less circuits, and the connection relationship between the circuits is not limited and may be determined according to actual requirements. The specific configuration of each circuit is not limited, and may be composed of analog devices, digital chips, or other applicable methods according to circuit principles.

Figure 3D:
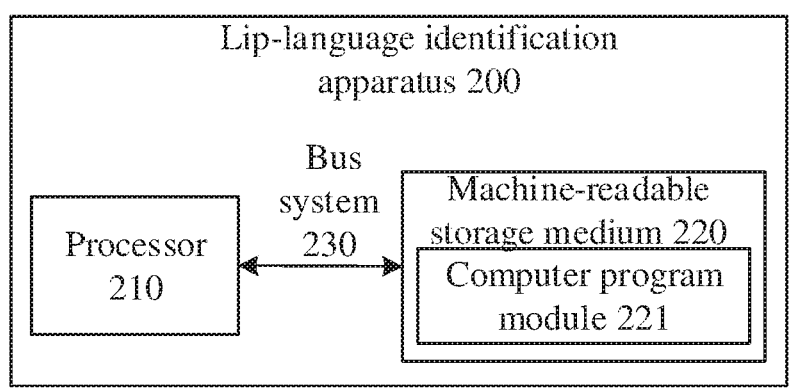
FIG. 3D is a schematic block diagram of another lip-language identification apparatus provided by at least one embodiment of the present disclosure.

FIG. 3D is a schematic block diagram of another lip-language identification apparatus provided by at least one embodiment of the present disclosure. As illustrated in FIG. 3D, the lip-language identification apparatus 200 includes a processor 210, a machine-readable storage medium 220, and one or more computer program modules 221.

For example, the processor 210 and the machine-readable storage medium 220 are connected by a bus system 230. For example, the one or more computer program modules 221 are stored in the machine-readable storage medium 220. For example, the one or more computer program modules 221 include instructions for performing the lip-language identification method provided by any embodiment of the present disclosure. For example, instructions in one or more computer program modules 221 may be executed by the processor 210. For example, the bus system 230 may be a common serial or parallel communication bus, and the embodiments of the present disclosure are not limited to this.

For example, the processor 210 may be a central processing unit (CPU), an image processing unit (GPU), or other forms of processing units having data processing capability and/or instruction execution capability, may be a general-purpose processor or a special-purpose processor, and may control other components in the lip-language identification apparatus 200 to perform desired functions.

The machine-readable storage medium 220 may include one or more computer program products, which may include various forms of computer-readable storage media, such as volatile memory and/or non-volatile memory. The volatile memory may include, for example, random access memory (RAM) and/or cache, etc. The nonvolatile memory may include, for example, read only memory (ROM), hard disk, flash memory, and the like. One or more computer program instructions may be stored on the computer-readable storage medium, and the processor 210 may execute the program instructions so as to implement functions in the embodiments of the present disclosure (implemented by the processor 210) and/or other desired functions, such as the lip-language identification method, etc. The computer-readable storage medium may also store various application programs and various data, such as a sequence of face images and various data used and/or generated by the application programs.

It should be noted that, for clarity and conciseness, the embodiments of the present disclosure do not provide all components of the lip-language identification apparatus 200. In order to implement necessary functions of the lip-language identification apparatus 200, those skilled in the art may provide and set other components not illustrated according to specific requirements, and the embodiments of the present disclosure are not limited to this.

The technical effects of the lip-language identification apparatus 100 and the lip-language identification apparatus 200 in different embodiments may refer to the technical effects of the lip-language identification method provided in the embodiments of the present disclosure and will not be repeated here.

Figure 3E:
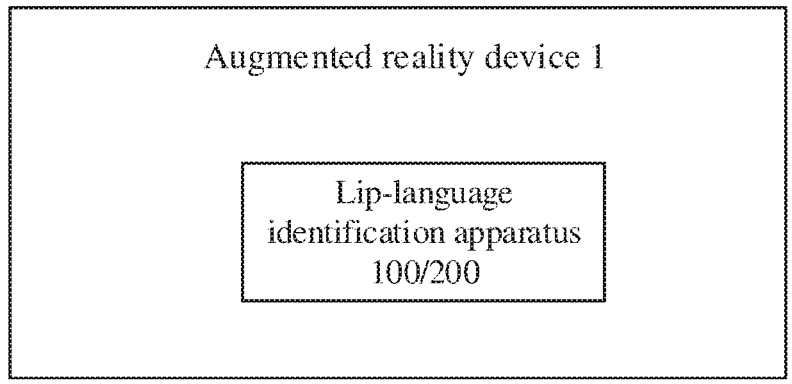
FIG. 3E is a schematic block diagram of an augmented reality device provided by at least one embodiment of the present disclosure.

At least one embodiment of the present disclosure also provides an augmented reality device. FIGS. 3E-4 are schematic block diagrams of an augmented reality device provided by at least one embodiment of the present disclosure, respectively.

As illustrated in FIG. 3E, in one example, an augmented reality device 1 includes the lip-language identification apparatus 100/200 provided in any embodiment of the present disclosure. The lip-language identification apparatus 100/200 may refer to the relevant descriptions of FIGS. 3A to 3D in detail, and will not be repeated here. For example, the augmented reality device 1 further includes a camera device, a display device, or a play device. For example, a camera is used to collect images of object to be identified; the display device is used to display semantic text information; the play device is used to play semantic audio information. For example, the play device may be a speaker, a sound box, etc. The following description will take a speaker as an example, and the embodiments of the present disclosure are not limited to this.

Figure 3F:
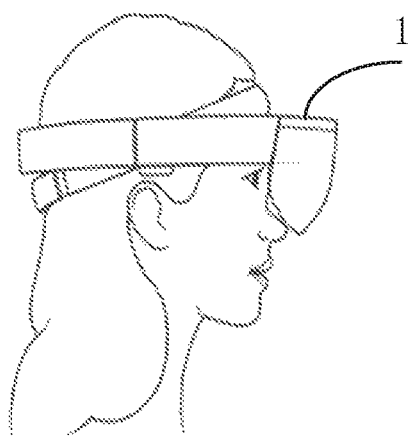
FIG. 3F is a schematic block diagram of another augmented reality device provided by at least one embodiment of the present disclosure.
Figure 4:
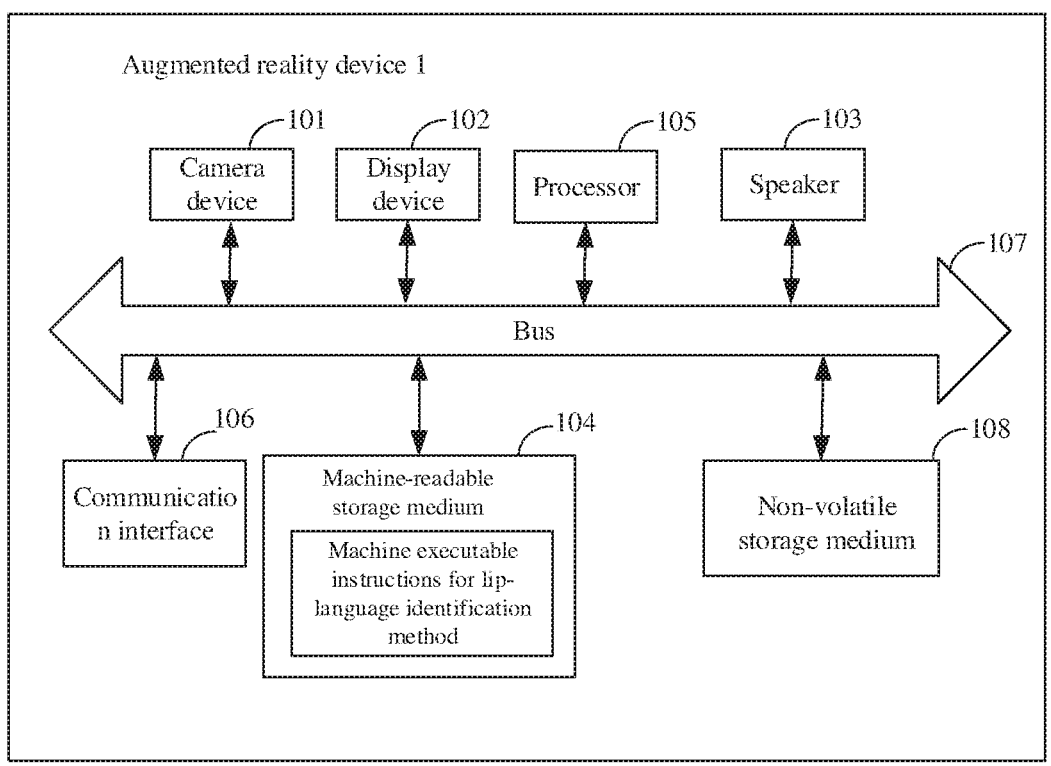
FIG. 4 is a schematic structural diagram of yet another augmented reality device provided by at least one embodiment of the present disclosure.

As illustrated in FIG. 3F, the augmented reality device 1 may be worn on the eyes of a person, thereby implementing the lip-language identification function of an object to be identified as required.

For example, in another example, referring to FIG. 4, the AR device 1 includes input/output (I/O) devices such as a camera device 101 (e.g., a camera for collecting images of an object to be identified), a display device 102 (for displaying semantic text information), a speaker 103 (for playing semantic audio information), and the like.

For example, the AR device 1 further includes: a machine-readable storage medium 104, a processor 105, a communication interface 106 and a bus 107. For example, the camera device 101, the display device 102, the speaker 103, the machine-readable storage medium 104, the processor 105, and the communication interface 106 complete communication with each other through the bus 107. The processor 105 may perform the lip-language identification method described above by reading and executing machine executable instructions corresponding to the control logic of the lip-language identification method in the machine-readable storage medium 104.

For example, the communication interface 106 is connected to a communication apparatus (not shown in figures). The communication apparatus may communicate with a network (such as the Internet, an intranet, and/or a wireless network such as a cellular telephone network, a wireless local area network (LAN), and/or a metropolitan area network (MAN)) and other devices through wireless communication. The wireless communication may use any of a variety of communication standards, protocols and technologies, which includes but is not limited to, global system for mobile communications (GSM), enhanced data GSM environment (EDGE), wideband code division multiple access (W-CDMA), code division multiple access (CDMA), time division multiple access (TDMA), Bluetooth, Wi-Fi (e.g., based on IEEE 802.11a. IEEE 802.11b. IEEE 802.11g, and/or IEEE 802.11n standards), voice over internet protocol (VoIP), Wi-MAX, protocols for e-mail, instant messaging, and/or short message service (SMS), or any other applicable communication protocols.

The machine-readable storage medium 104 mentioned in embodiments of the present disclosure may be any electronic, magnetic, optical, or other physical storage device that may contain or store information such as executable instructions, data, and the like. For example, the machine-readable storage medium may be RAM, a volatile memory, a non-volatile memory, a flash memory, a storage drive (e.g., hard disk drive), any type of storage disk (e.g., optical disk, DVD, etc.), or a similar machine-readable storage medium, or a combination thereof.

Non-volatile storage medium 108 may be a non-volatile memory, a flash memory, a storage drive (e.g., a hard disk drive), any type of storage disk (e.g., an optical disk, DVD, etc.), or a similar non-volatile storage medium, or a combination thereof.

It should be noted that the embodiments of the present disclosure do not provide all components of the AR device 1 for clarity and conciseness. In order to implement the necessary functions of the AR device 1, those skilled in the art may provide and set other components not shown according to specific needs, and the embodiments of the present disclosure are not limited to this.

At least one embodiment of the present disclosure also provides a storage medium. For example, the storage medium stores non-transitorily computer readable instructions, and when the non-transitory computer-readable instructions are executed by a computer (including a processor), the lip-language identification method provided by any embodiment of the present disclosure may be performed.

For example, the storage medium may be any combination of one or more computer-readable storage mediums, for example, one computer-readable storage medium contains computer-readable program code for acquiring a sequence of face images for an object to be identified, and another computer-readable storage medium contains computer-readable program code for outputting semantic information. For example, when the program code is read by a computer, the computer may execute the program code stored in the computer storage medium so as to perform, for example, the lip-language identification method provided in any embodiment of the present disclosure.

For example, the storage medium may include a memory card of a smart phone, a storage component of a tablet computer, a hard disk of a personal computer, random access memory (RAM), read-only memory (ROM), erasable programmable read-only memory (EPROM), portable compact disk read-only memory (CD-ROM), flash memory, or any combination of the above storage media, and may also be other applicable storage media.

For the present disclosure, the following statements should be noted:

(1) The accompanying drawings involve only the structure(s) in connection with the embodiment(s) of the present disclosure, and for other structure(s), reference can be made to common design(s).

(2) The embodiments of the present disclosure and features in the embodiments may be combined with each other to obtain new embodiments if they do not conflict with each other.

What are described above is related to the specific embodiments of the disclosure only and not limitative to the scope of the disclosure, and the scopes of the disclosure are defined by the accompanying claims.

What is claimed is:

1. A lip-language identification method based on an augmented reality device, the augmented reality device comprising a camera device and an infrared sensor, the method comprising:
    acquiring, by the augmented reality device, a sequence of face images for an object to be identified;
    sending, by the augmented reality device, the sequence of face images to a server;
    performing, by the server, lip-language identification based on the sequence of face images, so as to determine semantic information of speech content of the object to be identified corresponding to lip actions in the face images; and
    receiving, by the augmented reality device, the semantic information sent by the server and outputting the semantic information,
    wherein acquiring the sequence of face images for the object to be identified, comprises:
    acquiring a sequence of images including the object to be identified;
    positioning the object to be identified and acquiring azimuth of the object to be identified; and
    determining a position of a face region of the object to be identified in each frame of image in the sequence of images according to the positioned azimuth of the object to be identified; and generating the sequence of face images by cropping an image of the face region of the object to be identified from each frame of the images; and
    wherein positioning the azimuth of the object to be identified, comprises:
    positioning the azimuth of the object to be identified according to a voice signal emitted when the object to be identified is speaking, and
    positioning the azimuth of the object to be identified by sensing the object to be identified through the infrared sensor;
    wherein the azimuth of the object to be identified is an angle between the position of the object to be identified and a central axis of the field of view range of the camera device;
    wherein the semantic information is semantic text information and/or semantic audio information;
    wherein outputting the semantic information comprises:
    displaying, by the augmented reality device, the semantic text information within a visual field of a user wearing the augmented reality device, in response to receiving a display mode instruction; and
    playing, by the augmented reality device, the semantic audio information, in response to receiving an audio mode instruction.

2. The lip-language identification method according to claim 1, further comprising saving the sequence of face images, after acquiring the sequence of face images for the object to be identified.

3. The lip-language identification method according to claim 2, wherein sending the sequence of face images to the server comprises:
    sending the saved sequence of face images to the server upon receiving a sending instruction.

4. A lip-language identification apparatus, comprising:
    a processor; and
    a machine-readable storage medium, storing instructions that are executed by the processor for performing the lip-language identification method according to claim 1.

5. A storage medium that stores non-transitorily computer readable instructions that, when executed by a computer, the computer executes instructions for the lip-language identification method according to claim 1.

6. A lip-language identification apparatus, comprising:
    a face image sequence acquiring unit, configured to acquire a sequence of face images for an object to be identified;
    a sending unit, configured to send the sequence of face images to a server, wherein the server determines semantic information corresponding to lip actions in the face images by performing lip-language identification; and
    a receiving unit, configured to receive semantic information from the server,
    an output unit, configured to output semantic information;
    wherein the face image sequence acquiring unit comprises:
    an image sequence acquiring subunit, configured to acquire a sequence of images for the object to be identified;

a positioning subunit, configured to position an azimuth of the object to be identified; and a face image sequence generation subunit, configured to determine a position of a face region of the object to be identified in each frame of image in the sequence of images according to the positioned azimuth of the object to be identified; and crop an image of the face region of the object to be identified from the each frame image so as to generate the sequence of face images; and wherein the positioning subunit is further configured to position the azimuth of the object to be identified according to a voice signal emitted when the object to be identified is speaking, and position the azimuth of the object to be identified by sensing the object to be identified through an infrared sensor;

wherein the azimuth of the object to be identified is an angle between the position of the object to be identified and a central axis of the field of view range of a camera device;

wherein the output unit comprises:

an output mode instruction generation subunit, configured to generate a display mode instruction, wherein the output mode instruction includes a display mode instruction and an audio mode instruction;

wherein the semantic information is semantic text information and/or semantic audio information, and the output unit further comprises:

a display subunit, configured to display the semantic text information within a visual field of a user wearing an augmented reality device upon receiving the display mode instruction; and a play subunit, configured to play the semantic audio information upon receiving the audio mode instruction.

7. An augmented reality device, comprising the lip-language identification apparatus according to claim 6.

8. The augmented reality device according to claim 7, further comprising a camera device, a display device or a play device;

wherein the camera device is configured to capture an image of the object to be identified;

the display device is configured to display semantic information; and the play device is configured to play the semantic information.

* * * * *